(12) United States Patent
Hsiao et al.

(10) Patent No.: US 9,703,135 B2
(45) Date of Patent: Jul. 11, 2017

(54) DISPLAY (71) Applicant: Young Lighting Technology Inc., Hsin-Chu (TW)

(72) Inventors: Chun-Chung Hsiao, Hsin-Chu (TW); Bing-Han Tsai, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 12 days.

(21) Appl. No.: 14/737,510

(22) Filed: Jun. 12, 2015

(65) Prior Publication Data

US 2016/0033817 A1 Feb. 4, 2016

(30) Foreign Application Priority Data

Jul. 29, 2014 (TW) .............................. 103125836 A (51) Int. Cl.
*G02F 1/1333* (2006.01)

(52) U.S. Cl.
CPC .... *G02F 1/13338* (2013.01); *G02F 1/133308* (2013.01); *G02F 2001/133325* (2013.01); *G02F 2202/28* (2013.01)

(58) Field of Classification Search
CPC ............ G02F 1/1333; G02F 1/133308; G02F 1/133615; G02F 1/13338; G02F 1/1336; G02F 1/133608; G02F 1/133524; G02F 1/0105; G02F 1/133305; G02F 1/1335; G02F 2001/133317; G02F 2001/133314; G02F 2001/13332; G02F 2001/133322; G02F 2001/133325; G02F 2001/133331; G02F 2202/28; G02F 2201/46; G02F 2201/50; G02B 6/0088; G02B 6/005; G02B 6/0055; G02B 6/0011; G02B 6/0053; G02B 6/0031; G02B 6/0043; G02B 6/0051; G02B 6/0028; G02B 6/00; G02B 6/0025; G02B 6/0035; G02B 6/0041; H04N 5/2252; H04N 5/645; H04N 5/655; C09J 7/0246
USPC ..... 362/97.1, 609, 610, 615, 633, 97.2, 225, 362/632, 634; 349/58, 65, 12, 122, 62, 349/16; 361/752; 385/129; 156/305, 60
See application file for complete search history.

(56) References Cited

U.S. PATENT DOCUMENTS 7,990,487 B2 * 8/2011 Kim ................. G02F 1/133308
349/56
8,390,756 B2 * 3/2013 Inoue ................... G02B 6/0031
349/58

(Continued)

FOREIGN PATENT DOCUMENTS

TW 200923507 6/2009
TW 201217843 5/2012

(Continued)

OTHER PUBLICATIONS

"Office Action of Taiwan Counterpart Application," issued on Oct. 26, 2015, p. 1-p. 5.

*Primary Examiner* — Thoi Duong
(74) *Attorney, Agent, or Firm* — Jianq Chyun IP Office (57) ABSTRACT

A display including a casing, a light guide plate and a display panel is provided. The light guide plate is disposed in the casing and has a light emitting surface and a first back surface opposite to each other, wherein the casing is adhered to the first back surface of the light guide plate. The display panel is disposed in the casing and adhered to the light emitting surface of the light guide plate.

11 Claims, 4 Drawing Sheets

(56) References Cited

U.S. PATENT DOCUMENTS

| | | | |
|---|---|---|---|
| 2003/0128307 A1* | 7/2003 | Ito | G02F 1/133308 349/58 |
| 2007/0222912 A1* | 9/2007 | Sato | G02F 1/133528 349/58 |
| 2009/0185100 A1* | 7/2009 | Matsuhira | G02B 6/005 349/58 |
| 2010/0296027 A1* | 11/2010 | Matsuhira | G02F 1/133308 349/96 |
| 2010/0315570 A1 | 12/2010 | Mathew et al. | |
| 2013/0148381 A1* | 6/2013 | Hatta | G02B 6/0033 362/624 |
| 2014/0232969 A1* | 8/2014 | Tsubaki | G02F 1/133308 349/58 |
| 2015/0138484 A1* | 5/2015 | Watanabe | G02F 1/133308 349/58 |
| 2015/0355506 A1* | 12/2015 | Kim | G02B 6/0073 362/607 |

FOREIGN PATENT DOCUMENTS

| | | |
|---|---|---|
| TW | 201341894 | 10/2013 |
| TW | 201405211 | 2/2014 |
| TW | I448775 | 8/2014 |
| TW | 201516524 | 5/2015 |

* cited by examiner

DISPLAY

CROSS-REFERENCE TO RELATED APPLICATION

This application claims the priority benefit of Taiwan application serial no. 103125836, filed on Jul. 29, 2014. The entirety of the above-mentioned patent application is hereby incorporated by reference herein and made a part of this specification.

BACKGROUND OF THE INVENTION

1. Field of the Invention

The invention generally relates to a display, and more particularly, to a display having a light guide plate.

2. Description of Related Art

Following the advancements in the semiconductor industry and the related electronic industry, the developments of smart phones, notebook computers and other digitized tools, etc, trend toward the directions of conveniences, multi-functionality and appealing designs. The display screen of these products is an indispensable communicating interface, which allows the user to operate these products more conveniently, whereby liquid crystal displays (LCDs) have become the mainstream of display screens. However, since the LCD panels of the LCDs do not have a light-emitting function themselves, a backlight module is required be disposed under the LCD panels so as to provide light beam to the LCD for the display function.

In a conventional assembling method, it is typically to first assemble the backlight module and the LCD panel into a liquid crystal display module (LCM), then combine the liquid crystal display module and a front panel (such as a touch panel or a front frame), and adhere the front panel within the case body of a casing. In order to be assembled into the liquid crystal display module, the backlight module and the LCD panel are required to use components, such as the back plate, the frame and the cell tape, and the casing is required to be configured with engagement structures for engaging the said case body. Under the aforementioned configuration and assembling method, the use of excessive components such as the back plate, the frame, the cell tape, and the engagement structures, etc is not conducive in reducing the overall dimension of the display and achieving a slim border design, whereby having too much components would also increase production costs.

Taiwan Patent No. TW201405211A disclosed a display, whereby a back side of a light guide plate thereof is adhered to a back cover via a double-sided adhesive. Taiwan Patent No. TW201217843A1 disclosed a touch apparatus, whereby peripheral edges of a light guide plate thereof are fixed to a touch panel and a casing via double-sided adhesives. Taiwan Patent No. TW200923507 disclosed a surface light source, whereby a material of a light guide plate thereof is glass.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention is directed to a display having a smaller overall dimension, which is conducive to achieve a slim border design and save production costs.

To achieve at least one of the said objects and advantages, and in accordance with the purpose of the invention, as embodied and broadly described herein, an embodiment of the invention provides a display including a casing, a light guide plate and a display panel. The light guide plate is disposed in the casing and has a light emitting surface and a first back surface opposite to each other, wherein the casing is adhered to the first back surface of the light guide plate. The display panel is disposed in the casing and adhered to the light emitting surface of the light guide plate.

In an embodiment of the invention, a material of the light guide plate includes glass, quartz or sapphire.

In an embodiment of the invention, the display further includes a first adhesive layer and a reflective layer, wherein the casing is adhered to the first back surface via the first adhesive layer, and the reflective layer is disposed between the first back surface and the casing and surrounded by the first adhesive layer.

In an embodiment of the invention, the display further includes a second adhesive layer and an optical film set, wherein the display panel is adhered to the light emitting surface via the second adhesive layer, and the optical film set is disposed between the light emitting surface and the display panel and surrounded by the second adhesive layer.

In an embodiment of the invention, the display further includes a front panel, wherein the display panel has a display surface and a second back surface opposite to each other, the second back surface is adhered to the light emitting surface, and the front panel is adhered to the display surface.

In an embodiment of the invention, the display further includes a third adhesive layer, wherein the third adhesive layer is an optical adhesive, and the front panel is adhered to the display surface via the third adhesive layer.

In an embodiment of the invention, the display further includes a third adhesive layer, wherein the front panel is adhered to the display surface via the third adhesive layer, the display surface has a display area, and the third adhesive layer surrounds the display area.

In an embodiment of the invention, the front panel is adhered to the light emitting surface.

In an embodiment of the invention, the display further includes a fourth adhesive layer, wherein the front panel is adhered to the light emitting surface via the fourth adhesive layer, and the fourth adhesive layer surrounds the display panel.

In an embodiment of the invention, the casing has a plurality of sidewalls, the sidewalls form an accommodation space therebetween, and the light guide plate, the display panel and the front panel are located in the accommodation space.

In an embodiment of the invention, the display further includes a frame body, wherein the frame body is disposed in the accommodation space and located between the front panel and the sidewalls.

In an embodiment of the invention, a periphery of the front panel is adjacent to the sidewalls.

In an embodiment of the invention, the casing has a plurality of sidewalls, theses sidewalls Rhin an accommodation space therebetween, the light guide plate and the display panel are located in the accommodation space, and the front panel is located out of the accommodation space and covers a front end of each of the sidewalls.

In an embodiment of the invention, the front panel is a touch panel.

In an embodiment of the invention, the front panel the front panel is a front frame, the display surface has a display area, and the front frame exposes the display area.

In view of the foregoing, the embodiments of the invention include at least one of the following advantages. In the embodiments of the invention, the light emitting surface and the first back surface of the light guide plate are respectively adhered to the display panel and the casing, so as to combine together the light guide plate, the display panel and the casing. As such, the light guide plate and the display panel are not required to be assembled together by conventional means of using components (such as the back plate, the frame, the cell tape and so forth), and a case body for installing the light guide plate and the display panel and engagement structures for engaging the said case body are not required to be configured within the casing, thereby being conducive in reducing the overall dimension of the display, achieving the slim border design and saving the production costs.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
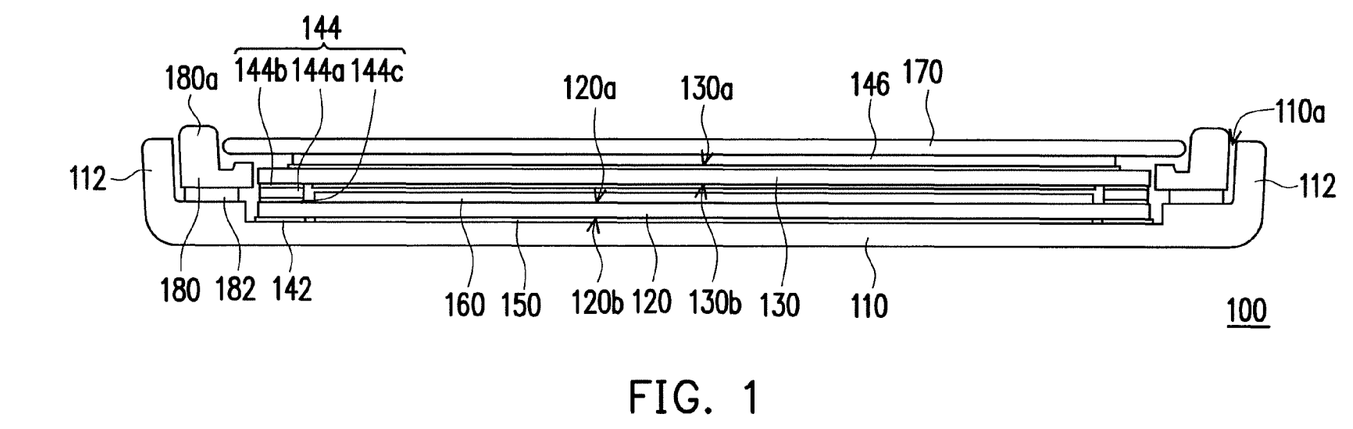
FIG. 1 is a schematic diagram illustrating a display according to an embodiment of the invention.

FIG. 1 is a schematic diagram illustrating a display according to an embodiment of the invention. Referring to FIG. 1, a display 100 of the embodiment is, for example, a display screen of a notebook computer, but not limited thereto. The display 100 includes a casing 110, a light guide plate 120 and a display panel 130, wherein the display panel 130 is, for example, a liquid crystal display panel. The light guide plate 120 is disposed in the casing 110 and has a light emitting surface 120a and a first back surface 120b opposite to each other. The casing 110 is adhered to the first back surface 120b of the light guide plate 120. The display panel 130 is disposed in the casing 110 and adhered to the light emitting surface 120a of the light guide plate 120. A light source (not shown) of the display 100 is, for example, disposed at a side of the light guide plate 120, and light beams emitted by this light source are transmitted by the light guide plate 120 so as to be supplied from the light emitting surface 120a to the display panel 130.

Accordingly, by means of adhering the light emitting surface 120a and the first back surface 120b of the light guide plate 120 respectively to the display panel 130 and the casing 110, the light guide plate 120, the display panel 130 and the casing 110 may be combined together. As such, the light guide plate 120 and the display panel 130 are not required to be assembled together by conventional means of using components (such as the back plate, the frame, the cell tape and so forth), and a case body for installing the light guide plate 120 and the display panel 130 and engagement structures for engaging the said case body are not required to be configured within the casing 110, thereby being conducive in reducing an overall dimension of the display 100, achieving a slim border design and saving production costs.

In the embodiment, a material of the light guide plate 120 is, for example, glass so that the light guide plate 120 may have favorable structural strength, and may be stability supported between the casing 110 and the display panel 130. In other embodiments, the material of the light guide plate 120 may be other suitable material, such as an artificial crystals slice of quartz, an artificial crystals slice of sapphire, or an artificial crystals slice of other ore, but not limited thereto.

Referring to FIG. 1, in detail, the display 100 of the embodiment includes a first adhesive layer 142 and a reflective layer 150, wherein the first adhesive layer 142 is, for example, a double-sided adhesive. The casing 110 is adhered to the first back surface 120b of the light guide plate 120 via the first adhesive layer 142, and the reflective layer 150 is disposed between the first back surface 120b of the light guide plate 120 and the casing 110, and is surrounded by the first adhesive layer 142. The light beams of the light source, after entered the light guide plate 120, are transmitted within the light guide plate 120 through total reflection of the light guide plate 120 and reflection of the reflective layer 150.

The display 100 of the embodiment further includes a second adhesive layer 144, a third adhesive layer 146, an optical film set 160, and a front panel 170. The front panel 170 is, for example, a touch panel or a light transmitting plate without touch function. The display panel 30 has a display surface 130a and a second back surface 130b opposite to each other, and the second back surface 130b of the display panel 130 is adhered to the light emitting surface 120a of the light guide plate 120 via the second adhesive layer 144. The optical film set 160 is disposed between the light emitting surface 120a of the light guide plate 120 and the display panel 130, and is surrounded by the second adhesive layer 144 wherein the second adhesive layer 144 is, for example, constituted by an intermediate layer 144a and two double-sided adhesives 144b and 144c that are respectively adhered to the two opposite sides of the intermediate layer 144a. The intermediate layer 144a has a sufficient thickness for enabling the double-sided adhesives 144b and 144c to respectively adhere to the display panel 130 and the light guide plate 120. The third adhesive layer 146 is, for example, an optical adhesive, which may be an optically clear adhesive (OCA) or an optically clear acrylic adhesive. The OCA and the optically clear acrylic adhesive may have characteristics of being high transparency, high transmittance, high adhesion, high temperature and humidity tolerability, and anti-air bubble, and a thickness thereof may be determined according to the condition of practice, such that the thickness thereof may, for example, be less than 100 μm. The front panel 170 is adhered to the display surface 130a of the display panel 130 via the third adhesive layer 146.

In the embodiment, the casing 110 has a plurality of sidewalls 112, and the sidewalls 112 form an accommodation space 110a therebetween. The light guide plate 120, the display panel 130 and the front panel 170 are located in the accommodation space 110a of the casing 110, and thereby are protected by the casing 110. The display 100 further includes a frame body 180, and the frame body 180 is disposed in the accommodation space 110a of the casing 110 and located between the front panel 170 and the sidewalls 112, wherein the frame body 180 is, for example, adhered to the casing 110 via the double-sided adhesive 182. The frame body 180 has a flange 180a, and the flange 180a protrudes out of the front panel 170, wherein a material of the flange 180a is, for example, plastic, rubber and so forth, which may be used as a cushioning material between the display panel 130 and the casing 110 or between the front panel 170 and the casing 110. In addition, the display screen (viz., the display 100) is closed-up to a host of the notebook computer, the flange 180a as being protruded out of the front panel 170 is suitable to contact the host of the notebook computer so as to prevent the display screen and the host from colliding with each other and causing damage.

Figure 2:
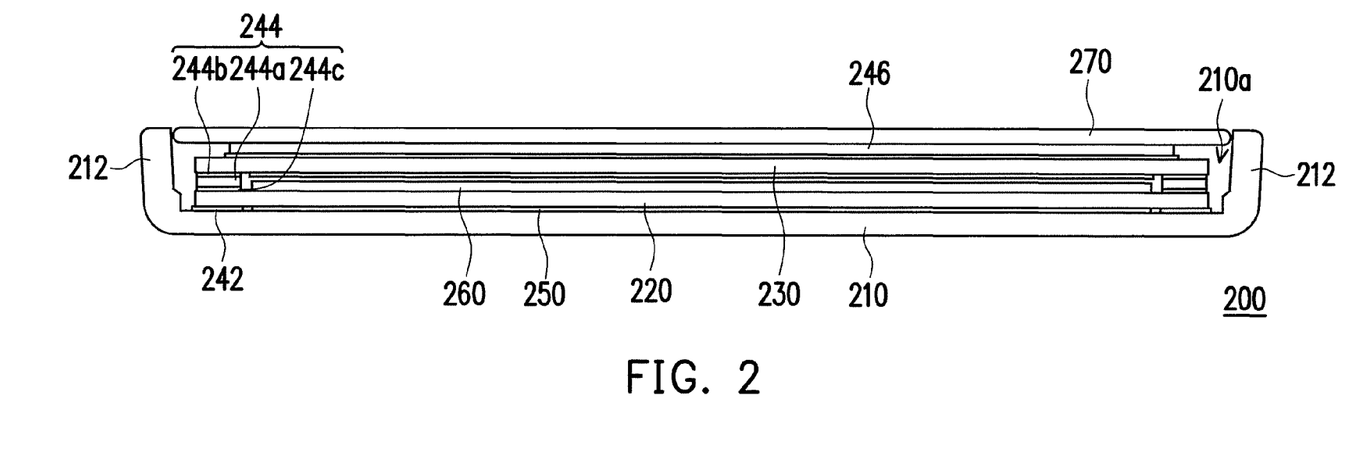
FIG. 2 is a schematic diagram illustrating a display according to another embodiment of the invention.

FIG. 2 is a schematic diagram illustrating a display according to another embodiment of the invention. In a display 200 of FIG. 2, configurations of a casing 210, sidewalls 212, an accommodation space 210a, a light guide plate 220, a display panel 230, a first adhesive layer 242, a second adhesive layer 244, an intermediate layer 244a, a double-sided adhesive 244b, a double-sided adhesive 244c, a third adhesive layer 246, a reflective layer 250, an optical film set 260 and a front panel 270 are similar to that of the casing 110, the sidewalls 112, the accommodation space 110a, the light guide plate 120, the display panel 130, the first adhesive layer 142, the second adhesive layer 144, the intermediate layer 144a, the double-sided adhesive 144b, the double-sided adhesive 144c, the third adhesive layer 146, the reflective layer 150, the optical film set 160 and the front panel 170 in FIG. 1, and thus will not be repeated herein. A difference between the display 200 and the display 100 lies in that, the sidewalls 212 and the front panel 270 of the display 200 do not include the frame body 180 as shown in FIG. 1, and thus a periphery of the front panel 270 can be adjacent to the sidewalls 212, and thereby is conducive in achieving a slim border design.

Figures 3, 4:
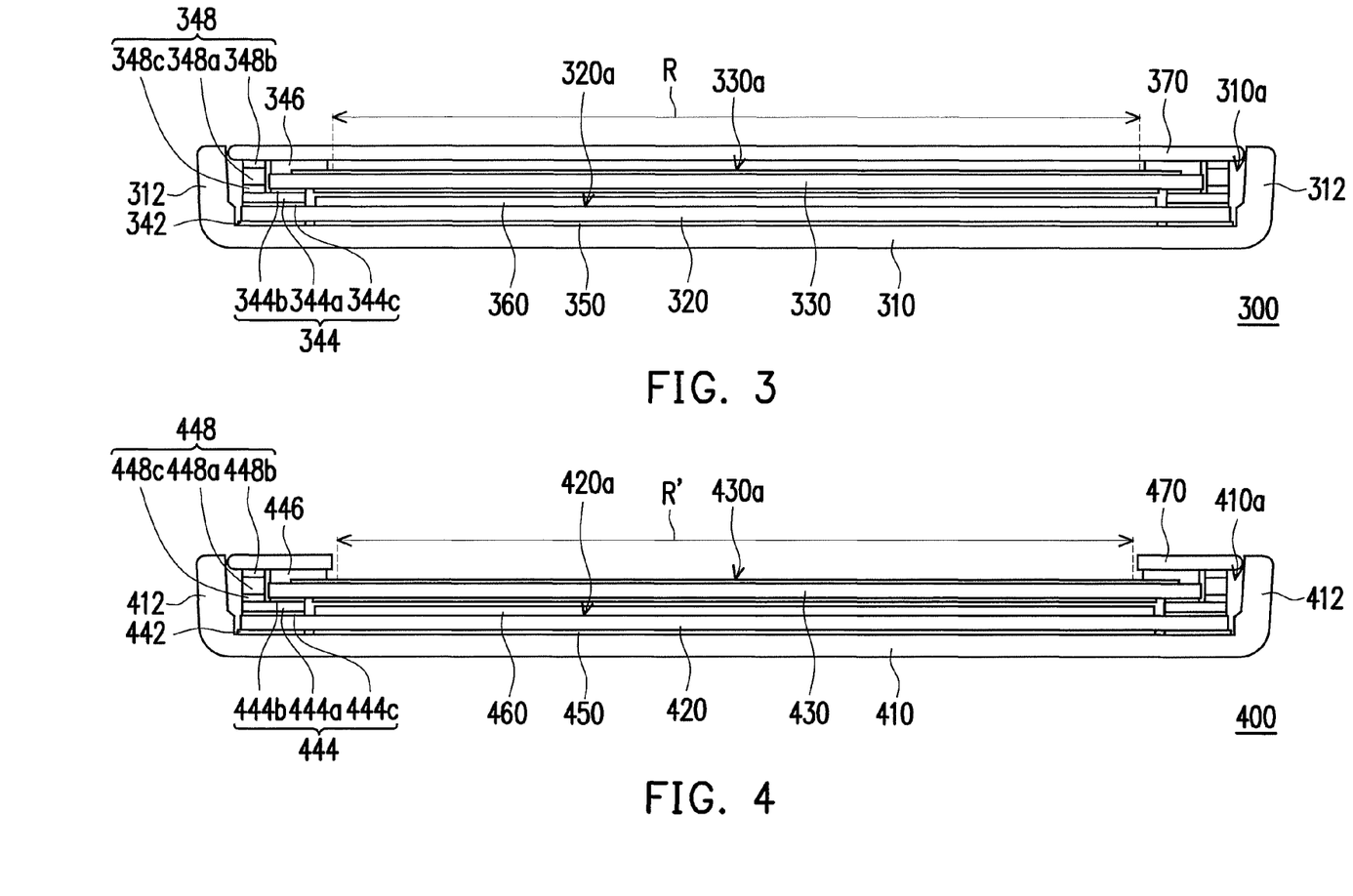
FIG. 3 is a schematic diagram illustrating a display according to another embodiment of the invention.
FIG. 4 is a schematic diagram illustrating a display according to another embodiment of the invention.

FIG. 3 is a schematic diagram illustrating a display according to another embodiment of the invention. In a display 300 of FIG. 3, configurations of a casing 310, sidewalls 312, an accommodation space 310a, a light guide plate 320, a display panel 330, a first adhesive layer 342, a second adhesive layer 344, an intermediate layer 344a, a double-sided adhesive 344b, a double-sided adhesive 344c, a reflective layer 350, an optical film set 360 and a front panel 370 are similar to that of the casing 210, the sidewalls 212, the accommodation space 210a, the light guide plate 220, the display panel 230, the first adhesive layer 242, the second adhesive layer 244, the intermediate layer 244a, the double-sided adhesive 244b, the double-sided adhesive 244c, the reflective layer 250, the optical film set 260 and the front panel 270 in FIG. 2, and thus will not be repeated herein. A difference between the display 300 and the display 200 lies in that, the front panel 370 is adhered to a display surface 330a of the display panel 330 via a third adhesive layer 346, wherein the third adhesive layer 346, unlike the third adhesive layer 246 shown in FIG. 2, is not an optical adhesive. Moreover, in order to prevent the third adhesive layer 346 from shielding a display area R of the display surface 330a, the third adhesive layer 346 is configured as to surround the display area R of the display surface 330a.

Another difference between the display 300 and the display 200 lies in that, the display 300 further includes a fourth adhesive layer 348. The front panel 370, in addition to being adhered to the display surface 330a of the display panel 330 via the third adhesive layer 346, may further be adhered to a light emitting surface 320a of the light guide plate 320 via the fourth adhesive layer 348 that surrounds the display panel 330, so that the overall structure of the display 300 may be more stable. In detail, the fourth adhesive layer 348 is, for example, constituted by an intermediate layer 348a and two double-sided adhesives 348b and 348c that are respectively adhered to the two opposite sides of the intermediate layer 348a, and the intermediate layer 348a has a sufficient thickness for enabling the double-sided adhesives 348b and 348c to respectively adhere to the front panel 370 and the second adhesive layer 344 on the light emitting surface 320a of the light guide plate 320.

FIG. 4 is a schematic diagram illustrating a display according to another embodiment of the invention. In a display 400 of FIG. 4, configurations of a casing 410, sidewalls 412, an accommodation space 410a, a light guide plate 420, a display panel 430, a first adhesive layer 442, a second adhesive layer 444, an intermediate layer 444a, a double-sided adhesive 444b, a double-sided adhesive 444c, a third adhesive layer 446, a fourth adhesive layer 448, an intermediate layer 448a, a double-sided adhesive 448b, a double-sided adhesive 448c, a reflective layer 450 and an optical film set 460 are similar to that of the casing 310, the sidewalls 312, the accommodation space 310a, the light guide plate 320, the display panel 330, the first adhesive layer 342, the second adhesive layer 344, the intermediate layer 344a, the double-sided adhesive 344b, the double-sided adhesive 344c, the third adhesive layer 346, the fourth adhesive layer 348, the intermediate layer 348a, the double-sided adhesive 348b, the double-sided adhesive 348c, the reflective layer 350 and the optical film set 360 in FIG. 3, and thus will not be repeated herein. A difference between the display 400 and the display 300 lies in that, a front panel 470 is a front frame, such that the front frame exposes a display area R' of a display surface 430a of the display panel 430, so as to enable a user to view a screen displayed by the display panel 430.

Figure 5:
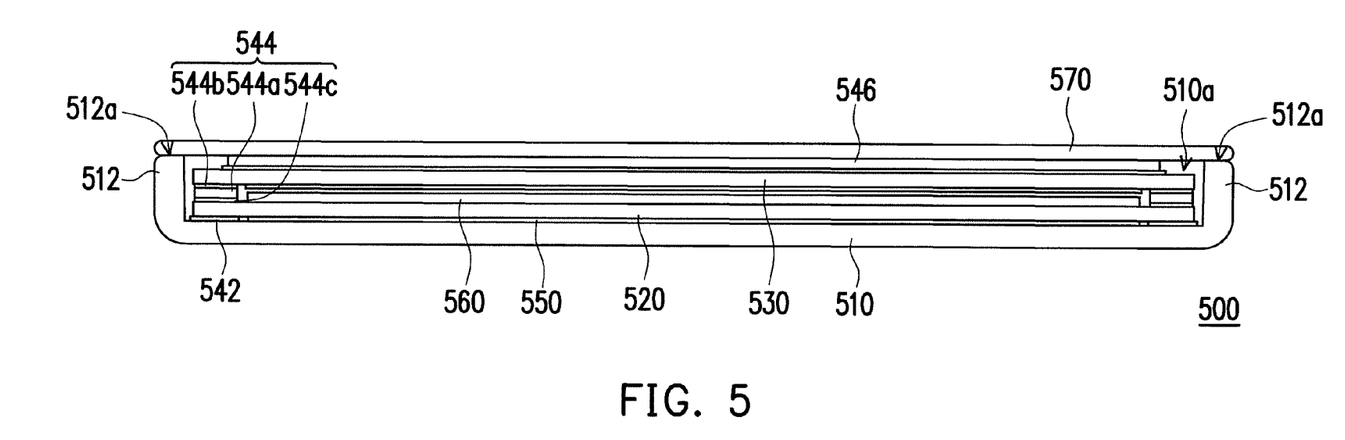
FIG. 5 is a schematic diagram illustrating a display according to another embodiment of the invention.

FIG. 5 is a schematic diagram illustrating a display according to another embodiment of the invention. In a display 500 of FIG. 5, configurations of a casing 510, sidewalls 512, an accommodation space 510a, a light guide plate 520, a display panel 530, a first adhesive layer 542, a second adhesive layer 544, an intermediate layer 544a, a double-sided adhesive 544b, a double-sided adhesive 544c, a third adhesive layer 546, a reflective layer 550 and an optical film set 560 are similar to that of the casing 210, the sidewalls 212, the accommodation space 210a, the light guide plate 220, the display panel 230, the first adhesive layer 242, the second adhesive layer 244, the intermediate layer 244a, the double-sided adhesive 244b, the double-sided adhesive 244c, the third adhesive layer 246, the reflective layer 250 and the optical film set 260 in FIG. 2, and thus will not be repeated herein. A difference between the display 500 and the display 200 lies in that, a front panel 570, unlike the front panel 270 located in the accommodation space 210a as shown in FIG. 2, is located out of the accommodation space 510a and covers a front end 512a of each of the sidewalls 512, so that the display 500 may better comply with the trend of slim border design.

Figure 6:
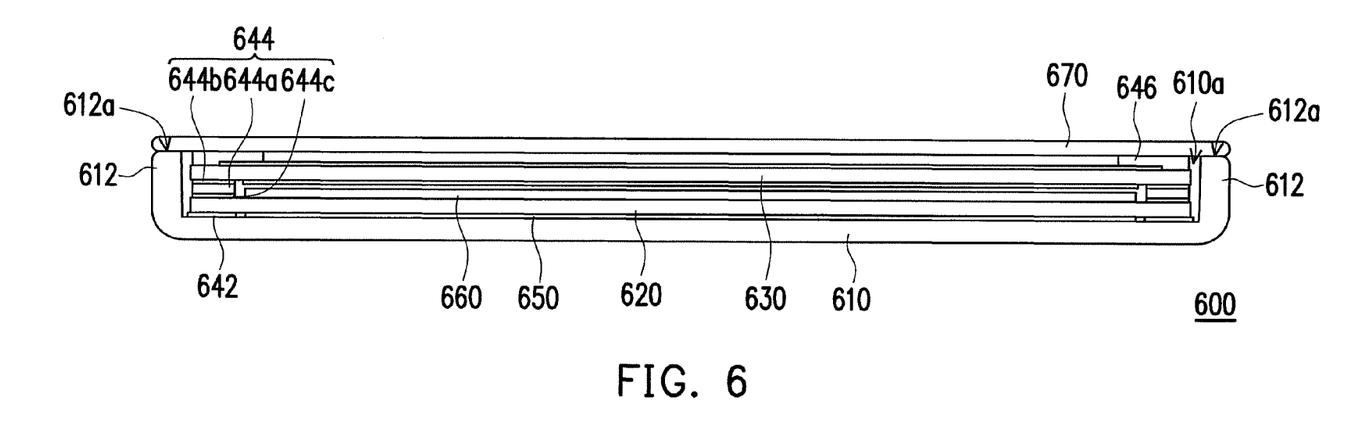
FIG. 6 is a schematic diagram illustrating a display according to another embodiment of the invention.

FIG. 6 is a schematic diagram illustrating a display according to another embodiment of the invention. In a display 600 of FIG. 6, configurations of a casing 610, sidewalls 612, an accommodation space 610a, a light guide plate 620, a display panel 630, a first adhesive layer 642, a second adhesive layer 644, an intermediate layer 644a, a double-sided adhesive 644b, a double-sided adhesive 644c, a third adhesive layer 646, a reflective layer 650 and an optical film set 660 are similar to that of the casing 310, the sidewalls 312, the accommodation space 310a, the light guide plate 320, the display panel 330, the first adhesive layer 342, the second adhesive layer 344, the intermediate layer 344a, the double-sided adhesive 344b, the double-sided adhesive 344c, the third adhesive layer 346, the reflective layer 350 and the optical film set 360 in FIG. 3, and thus will not be repeated herein. Differences between the display 600 and the display 300 lie in that, the display 600 does not include the fourth adhesive layer 348 as shown FIG. 3; and a front panel 670, unlike the front panel 370 located in the accommodation space 310a as shown in FIG. 3, is located out of the accommodation space 610a and covers a front end 612a of each of the sidewalls 612, so that the display 600 may better comply with the trend of slim border design.

Figure 7:
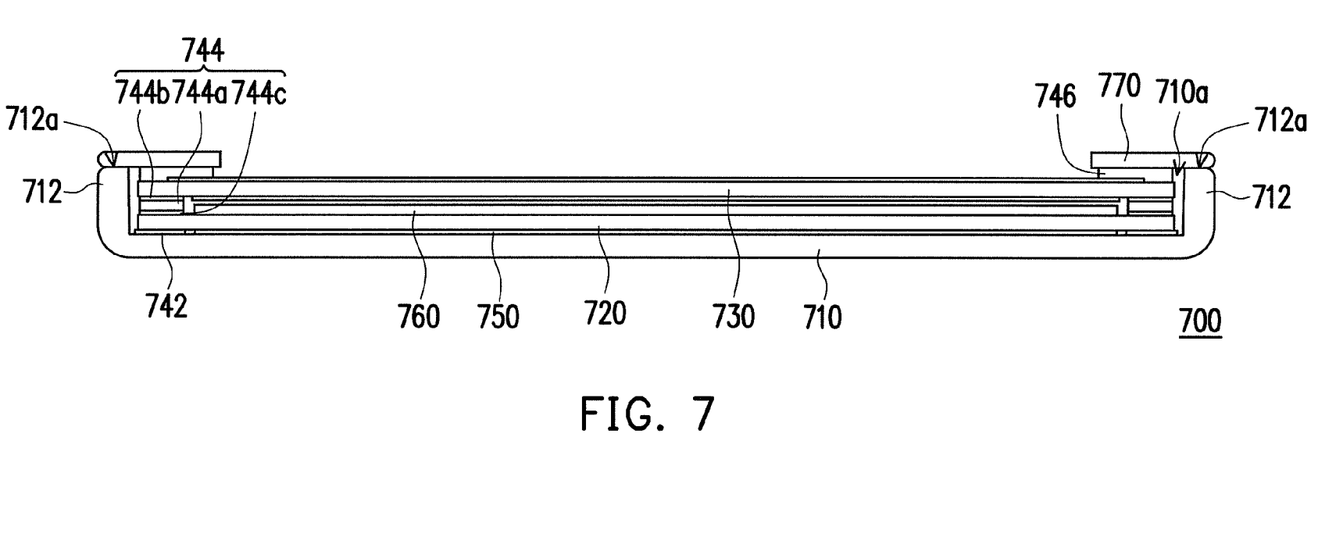
FIG. 7 is a schematic diagram illustrating a display according to another embodiment of the invention.

FIG. 7 is a schematic diagram illustrating a display according to another embodiment of the invention. In a display 700 of FIG. 7, configurations of a casing 710, sidewalls 712, an accommodation space 710a, a light guide plate 720, a display panel 730, a first adhesive layer 742, a second adhesive layer 744, an intermediate layer 744a, a double-sided adhesive 744b, a double-sided adhesive 744c, a third adhesive layer 746, a reflective layer 750 and an optical film set 760 are similar to that of the casing 410, the sidewalls 412, the accommodation space 410a, the light guide plate 420, the display panel 430, the first adhesive layer 442, the second adhesive layer 444, the intermediate layer 444a, the double-sided adhesive 444b, the double-sided adhesive 444c, the third adhesive layer 446, the reflective layer 450 and the optical film set 460 in FIG. 4, and thus will not be repeated herein. Differences between the display 700 and the display 400 lie in that, the display 700 does not include the fourth adhesive layer 448 as shown in FIG. 4; and a front panel 770, unlike the front panel 470 located in the accommodation space 410a as shown in FIG. 4, is located out of the accommodation space 710a and covers a front end 712a of each of the sidewalls 712, so that the display 700 may better comply with the trend of slim border design.

In summary, the embodiments of the invention include at least one of the following advantages. In the embodiments of the invention, the light emitting surface and the first back surface of the light guide plate are respectively adhered to the display panel and the casing, so as to combine together the light guide plate, the display panel and the casing. As such, the light guide plate and the display panel are not required to be assembled together by conventional means of using components (such as the back plate, the frame, the cell tape and so forth), and a case body for installing the light guide plate and the display panel and engagement structures for engaging the said case body are not required to be configured within the casing, thereby being conducive in reducing the overall dimension of the display, achieving the slim border design and saving the production costs. Moreover, the front panel, in addition to being adhered to the display panel, may further be adhered to the light guide plate, so that the overall structure of the display may be more stable.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such tennis should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display, comprising:
    a casing having a plurality of sidewalls;
    a light guide plate disposed in the casing and having a light emitting surface and a first back surface opposite to each other, wherein the casing is adhered to the first back surface of the light guide plate;
    a display panel disposed in the casing and adhered to the light emitting surface of the light guide plate, wherein the display further comprising a frame body, the frame body is disposed between the sidewalls of the casing and the display panel, the frame body has a flange, and the flange protrudes out of the display panel and the sidewalls; and
    a front panel, wherein the display panel has a display surface and a second back surface opposite to each other, the second back surface is adhered to the light emitting surface, the front panel is adhered to the display surface, the sidewalls form an accommodation space therebetween, and the light guide plate, the display panel and the front panel are located in the accommodation space, wherein the frame body is disposed in the accommodation space and located between the front panel and the sidewalls, and the flange protrudes out of the front panel and the sidewalls.

2. The display as recited in claim 1, wherein a material of the light guide plate comprises glass, quartz or sapphire.

3. The display as recited in claim 1, further comprising a first adhesive layer and a reflective layer, wherein the casing is adhered to the first back surface via the first adhesive layer, and the reflective layer is disposed between the first back surface and the casing and surrounded by the first adhesive layer.

4. The display as recited in claim 1, further comprising a second adhesive layer and an optical film set, wherein the display panel is adhered to the light emitting surface via the second adhesive layer, and the optical film set is disposed between the light emitting surface and the display panel and surrounded by the second adhesive layer.

5. The display as recited in claim 1, further comprising a third adhesive layer, wherein the third adhesive layer is an optical adhesive, and the front panel is adhered to the display surface via the third adhesive layer.

6. The display as recited in claim 1, further comprising a third adhesive layer, wherein the front panel is adhered to the display surface via the third adhesive layer, the display surface has a display area, and the third adhesive layer surrounds the display area.

7. The display as recited in claim 1, wherein the front panel is adhered to the light emitting surface.

8. The display as recited in claim 7, further comprising a fourth adhesive layer, wherein the front panel is adhered to the light emitting surface via the fourth adhesive layer, and the fourth adhesive layer surrounds the display panel.

9. The display as recited in claim 1, wherein a periphery of the front panel is adjacent to the sidewalls.

10. The display as recited in claim 1, wherein the front panel is a touch panel.

11. The display as recited in claim 1, wherein the front panel is a front frame, the display surface has a display area, and the front frame exposes the display area.

* * * * *